US009258398B2

(12) United States Patent
Tamatsu

(10) Patent No.: US 9,258,398 B2
(45) Date of Patent: Feb. 9, 2016

(54) TERMINAL HOLDING STAND INCLUDING SPEECH FUNCTION

(71) Applicant: NEC PLATFORMS, LTD., Kawasaki-shi, Kanagawa (JP)

(72) Inventor: Jun Tamatsu, Kanagawa (JP)

(73) Assignee: NEC Platforms, Ltd., Kanagawa (JP)

(*) Notice: Subject to any disclaimer, the term of this patent is extended or adjusted under 35 U.S.C. 154(b) by 0 days.

(21) Appl. No.: 14/423,364

(22) PCT Filed: Oct. 11, 2013

(86) PCT No.: PCT/JP2013/078392
§ 371 (c)(1),
(2) Date: Feb. 23, 2015

(87) PCT Pub. No.: WO2014/073357
PCT Pub. Date: May 15, 2014

(65) Prior Publication Data
US 2015/0189054 A1    Jul. 2, 2015

(30) Foreign Application Priority Data
Nov. 7, 2012  (JP) ................. 2012-245041

(51) Int. Cl.
*H04B 1/40* (2015.01)
*H04M 1/11* (2006.01)
(Continued)

(52) U.S. Cl.
CPC ........ *H04M 1/11* (2013.01); *H04M 1/04* (2013.01); *H04M 1/72527* (2013.01)

(58) Field of Classification Search
CPC ............ H04M 1/725; H04M 1/72502; H04M 2250/02; H04M 1/04; H04M 1/72527; H04M 1/2535; H04M 1/6066; H04M 1/7253; H04M 2203/1091; H04M 3/428; H04M 1/06; H04M 1/57; H04M 1/6041; H04M 1/6058; H04M 1/656; H04M 1/723; H04M 1/72519

USPC ........................................... 455/74.1
See application file for complete search history.

(56) References Cited

U.S. PATENT DOCUMENTS 7,430,441 B2  9/2008  Nagahama et al.
8,175,657 B2  5/2012  Okayasu
(Continued)

FOREIGN PATENT DOCUMENTS

CN   1604683 A    4/2005
CN   101808147 A   8/2010
(Continued)

OTHER PUBLICATIONS

International Search Report of PCT/JP2013/078392 dated Nov. 26, 2013 [PCT/ISA/210].
(Continued)

*Primary Examiner* — Ajibola Akinyemi
(74) *Attorney, Agent, or Firm* — Sughrue Mion, PLLC

(57) ABSTRACT

Provided is a terminal holding stand (10), which is capable of holding a portable terminal (40, 50) and includes a first speech control section (31). The terminal holding stand (10) comprises: a terminal communication section (34); a first transmission/reception section (60); a voice path control section (32) configured to establish a voice path one of between the first speech control section (31) and the first transmission/reception section (60) or between the terminal communication section (34) and the first transmission/reception section (60); and a switching request input section (26). When a switching request to switch a voice path, which is made by a user through depression of a speech switch button (26), is received under a state in which a speech to the portable terminal (40, 50) is established and the voice path to the portable terminal (40, 50) is formed, the voice path control section (32) disconnects the voice path between the portable terminal (40, 50) and the first transmission/reception section (60) while the speech established by the portable terminal (40, 50) is maintained. In this manner, the voice path in the portable terminal (40, 50) is established.

8 Claims, 9 Drawing Sheets

(51) Int. Cl.
 *H04M 1/04* (2006.01)
 *H04M 1/725* (2006.01)

(56) References Cited

U.S. PATENT DOCUMENTS

| | | |
|---|---|---|
| 2005/0070338 A1 | 3/2005 | Nagahama et al. |
| 2010/0210316 A1 | 8/2010 | Okayasu |
| 2011/0158214 A1* | 6/2011 | Sorondo ............. H04M 1/0202 370/338 |
| 2013/0225096 A1* | 8/2013 | Elter ....................... H04M 1/72 455/74.1 |

FOREIGN PATENT DOCUMENTS

| | | |
|---|---|---|
| JP | 08-251641 A | 9/1996 |
| JP | 08-256200 A | 10/1996 |
| JP | 3080744 U | 7/2001 |
| JP | 2003-169111 A | 6/2003 |
| JP | 2005-110049 A | 4/2005 |
| JP | 2005-294970 A | 10/2005 |
| JP | 2010-187289 A | 8/2010 |
| JP | 2012-044723 A | 3/2012 |
| WO | 2012/039173 A1 | 3/2012 |

OTHER PUBLICATIONS

Written Opinion of PCT/JP2013/078392 dated Nov. 26, 2013 [PCT/ISA/237].
Office Action of Japanese Application No. 2012-245041 dated May 28, 2014.
Communication dated Aug. 10, 2015, issued by the State Intellectual Property Office of the P.R.C. in corresponding Chinese Application No. 201380042954.2.

* cited by examiner

TERMINAL HOLDING STAND INCLUDING SPEECH FUNCTION

CROSS REFERENCE TO RELATED APPLICATIONS

This application is a National Stage of International Application No. PCT/JP2013/078392, filed Oct. 11, 2013, claiming priority based on Japanese Patent Application No. 2012-245041, filed Nov. 7, 2012, the contents of all of which are incorporated herein by reference in their entirety.

TECHNICAL FIELD

This invention relates to a terminal holding stand including a speech function, which is capable of holding a portable terminal including a speech function such as a smartphone (highly functional mobile phone) and has a speech function of establishing a speech via a speech circuit different from that of the portable terminal.

BACKGROUND ART

In general, there has been used, as a terminal holding stand capable of holding a portable terminal, a wireless communication device docking station including a stand having a connector arranged thereon, a handset connected to the stand, a transmission device installed in the stand, and a wired network interface installed in the stand (see Patent Document 1, for example).

The wireless communication device docking station of Patent Document 1 is configured to, when the stand and the portable terminal are connected to each other, operate the handset through the transmission device, to thereby enable a speech using a speech function of the portable terminal to be made through use of the handset connected to the stand.

PRIOR ART DOCUMENT

Patent Document

Patent Document 1: JP-A-2012-44723

SUMMARY OF THE INVENTION

Problem to be Solved by the Invention

In recent years, however, along with the widespread use of a portable terminal and diversification of its usage form, a request for a terminal holding stand configured to hold a portable terminal has also been diversified. From this point of view, the wireless communication device docking station of Patent Document 1 has a problem in that this wireless communication device docking station merely provides one usage form in which the handset connected to the stand can be used when a speech is being made through the portable terminal.

Therefore, this invention has been made to solve the problem on the above-mentioned document. Specifically, it is an object of this invention to provide a terminal holding stand having a speech function for facilitating diversification of its usage form, to thereby enhance convenience of a user.

Means to Solve the Problem

According to one aspect of this invention, there is provided a terminal holding stand including a speech function that solves the above-mentioned problem as follows. The terminal holding stand including a speech function and being capable of holding a portable terminal, the portable terminal comprising: a second transmission/reception section comprising a microphone and a speaker; and a second speech control section configured to establish a speech via a second speech circuit, the terminal holding stand comprising: a first speech control section configured to establish a speech via a first speech circuit; a terminal communication section configured to communicate to and from the portable terminal; a first transmission/reception section connected to the first speech control section and the terminal communication section, the first transmission/reception section comprising a microphone and a speaker, which enable a user to transmit and receive a speech; a voice path control section connected to the first transmission/reception section, the first speech control section, and the terminal communication section, the voice path control section being configured to establish a voice path one of between the first speech control section and the first transmission/reception section or between the terminal communication section and the first transmission/reception section; and a switching request input section connected to the voice path control section, the switching request input section being configured to receive from the user a switching request to switch the voice path, wherein when the switching request is received by the switching request input section under a state in which a speech is established by the second speech control section and a voice path is formed between the second speech control section and the first transmission/reception section via the terminal communication section, the voice path control section disconnects the voice path between the second speech control section and the first transmission/reception section while the speech established by the second speech control section is maintained, and instead, the voice path between the second speech control section and the second transmission/reception section is established.

According to one aspect of this invention, through provision of the first speech control section configured to establish a speech via the first speech circuit different from the portable terminal in circuit, the terminal holding stand itself being usable as a telephone set independently of the portable terminal. In addition, it is possible to make a speech by the use of the first transmission/reception section of the terminal holding stand, the speech being performed through the first speech control section of the terminal holding stand in each of the case where the speech is established through the first speech control section of the terminal holding stand and the case where the speech is established by the second speech control section of the portable terminal. It is therefore possible to facilitate diversification of the usage form, and thus it is possible to enhance the convenience of the user.

Further, according to one aspect of this invention, from the state in which a speech is established by the second speech control section of the portable terminal and the speech is being made through use of the first transmission/reception section of the terminal holding stand, it is possible to switch the voice path to the first transmission/reception section of the terminal holding stand to the voice path to the second transmission/reception section of the portable terminal, without disconnecting the speech established by the second speech control section of the portable terminal. In other words, the one aspect of this invention can cope with such a situation as a case where there arises a need for the user to, during a speech, move to another location while continuing the speech, and thus further enhance the convenience of the user.

MODE FOR EMBODYING THE INVENTION

A terminal holding stand according to an embodiment of this invention is described below with reference to the drawings.

It is to be noted that, in the following description, a fore-and-aft direction (depth direction) extending parallel to a main mounting surface of a holding stand main body is defined as an X-axis direction, a right-and-left direction (width direction, horizontal axis direction) extending parallel to the main mounting surface of the holding stand main body and orthogonal to the X-axis direction is defined as a Y-axis direction, and an up-and-down direction (height direction) orthogonal to the main mounting surface of the holding stand main body is defined as a Z-axis direction.

Exemplary Embodiment

A terminal holding stand 10 is capable of holding one of a plurality of types of portable terminals 40 and 50. The terminal holding stand 10 according to this embodiment is capable of selectively holding two types of portable terminals 40 and 50, including a first portable terminal 40 illustrated in FIG. 5 and a second portable terminal 50 illustrated in FIG. 7 having larger length and width dimensions than the first portable terminal 40.

In addition to a function as a holding stand for the portable terminals 40 and 50, the terminal holding stand 10 is configured to also function as a battery-charging stand for the portable terminals 40 and 50, as well as function as a desk telephone capable of working together with the portable terminals 40 and 50.

In the example of the figures, the first portable terminal 40 is a smartphone (highly functional mobile phone) such as an iPhone®, and the second portable terminal 50 is a tablet terminal (multifunction portable terminal) such as an iPad®.

Figure 9:
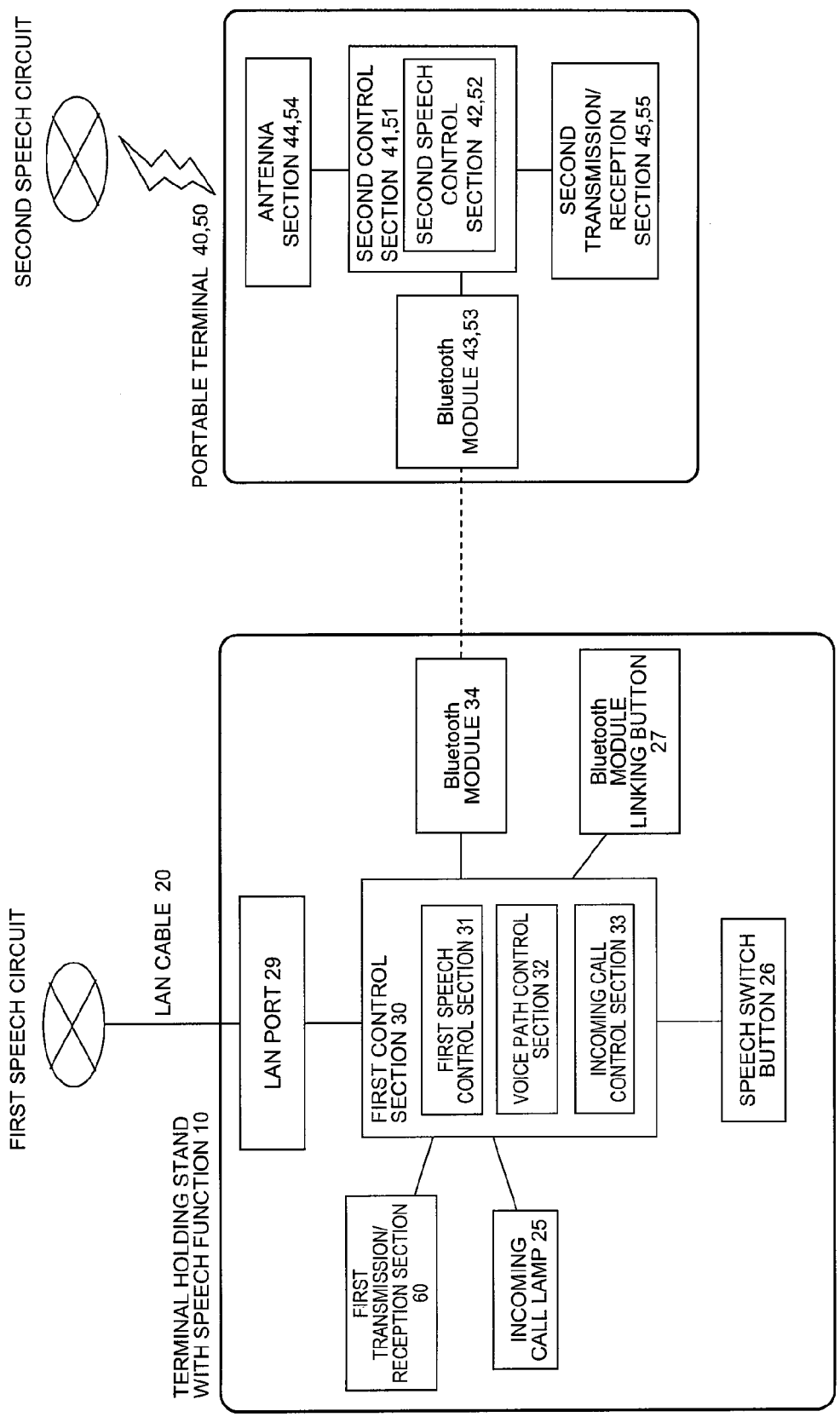
FIG. 9 is a block diagram mainly illustrating a speech function and a communication function of the terminal holding stand and the portable terminal.

As illustrated in FIG. 9, the portable terminals 40 and 50 respectively include Bluetooth® modules 43 and 53 configured to wirelessly communicate to and from the terminal holding stand 10, second transmission/reception sections 45 and 55 each including a microphone (not shown) and a speaker (not shown), configured to enable a user to transmit and receive a speech, antenna sections 44 and 54 configured to communicate to and from a second speech circuit such as 3G, LTE, 4G, or Wifi, and second control sections 41 and 51 configured to control those module and sections. As illustrated in FIG. 9, those module and sections are connected to one another.

The second control sections 41 and 51 are each formed of a circuit component (not shown) such as a CPU, and as illustrated in FIG. 9, respectively include second speech control sections 42 and 52 configured to establish a speech via the second speech circuit.

Figure 1:
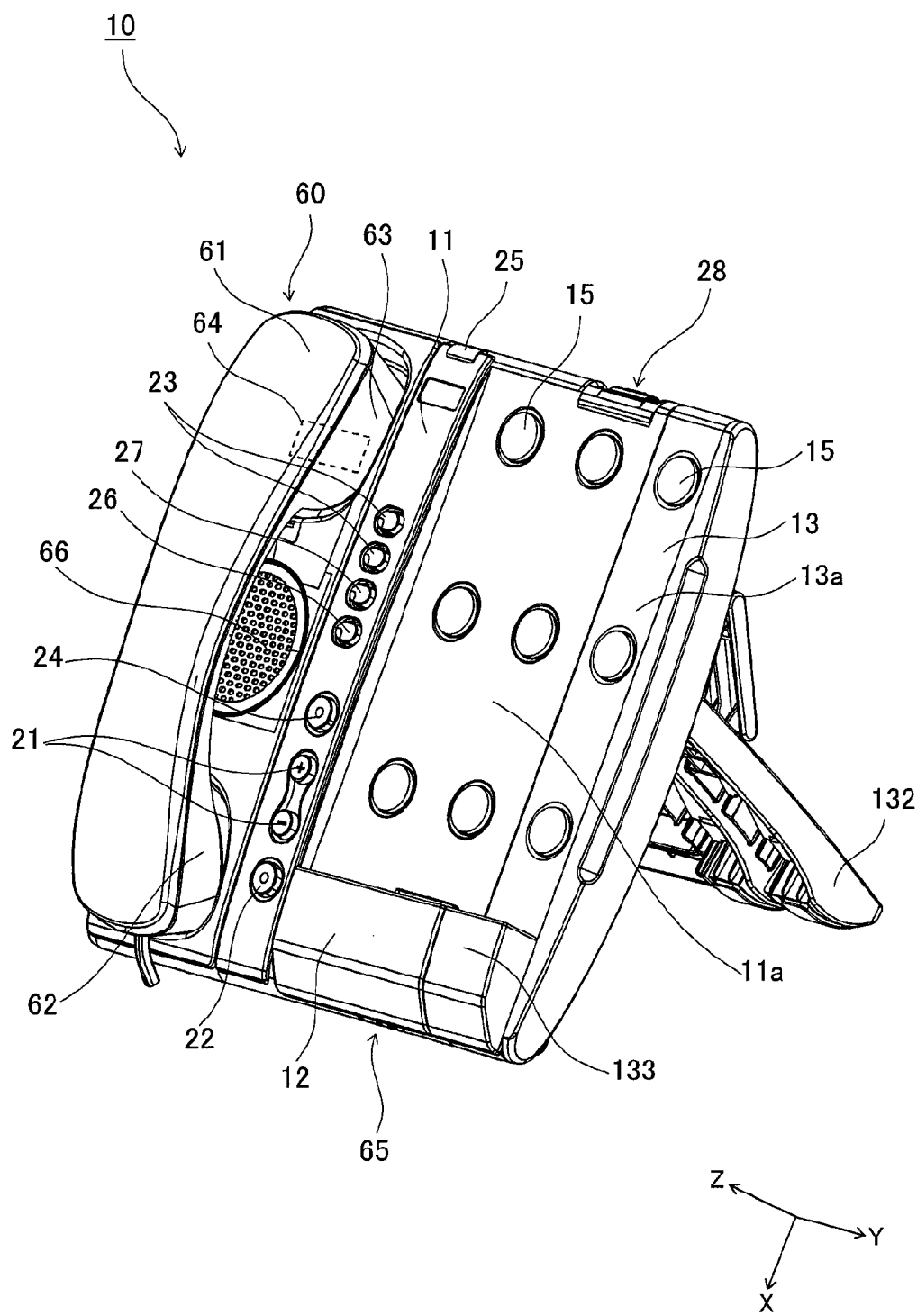
FIG. 1 is a perspective view illustrating a terminal holding stand according to an embodiment of this invention.
Figure 2:
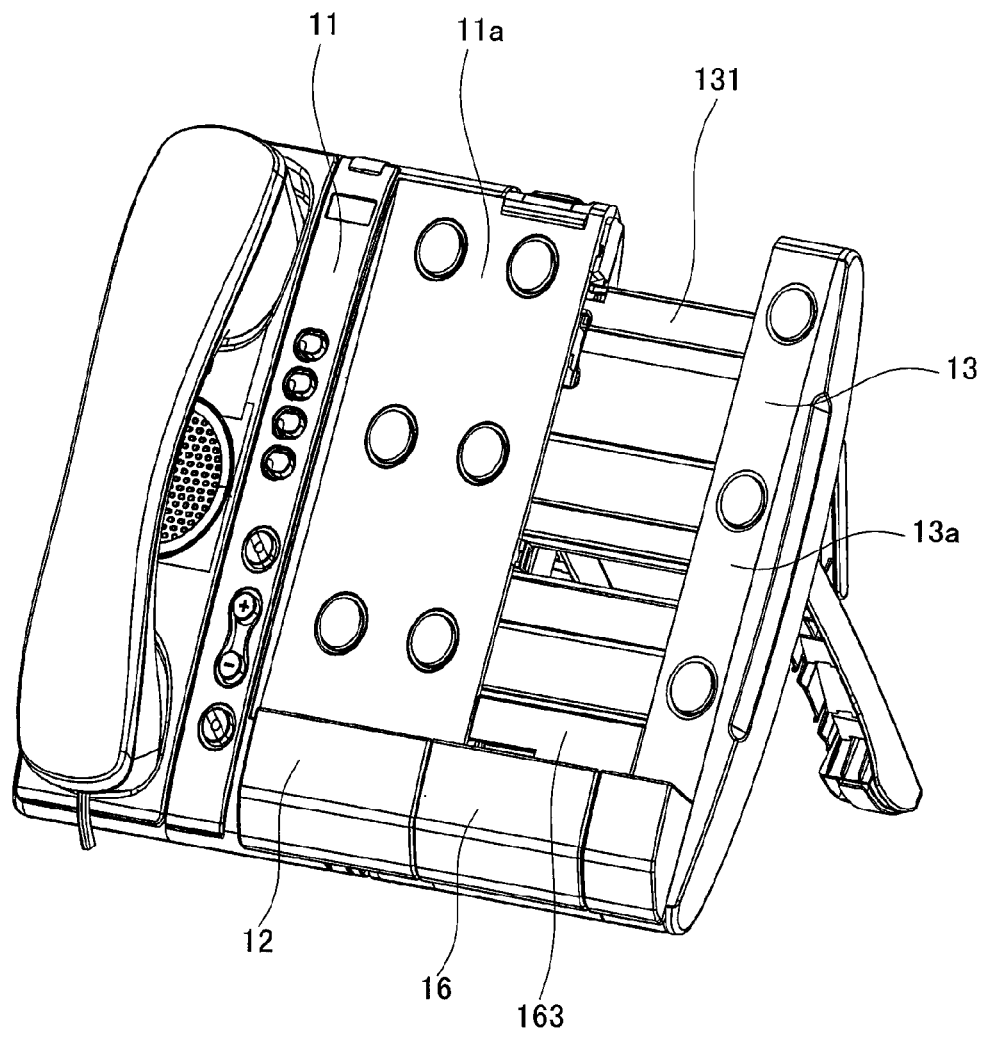
FIG. 2 is a perspective view illustrating a state in which an extensible holding member is extended, and an extensible terminal cover is mounted.
Figure 3:
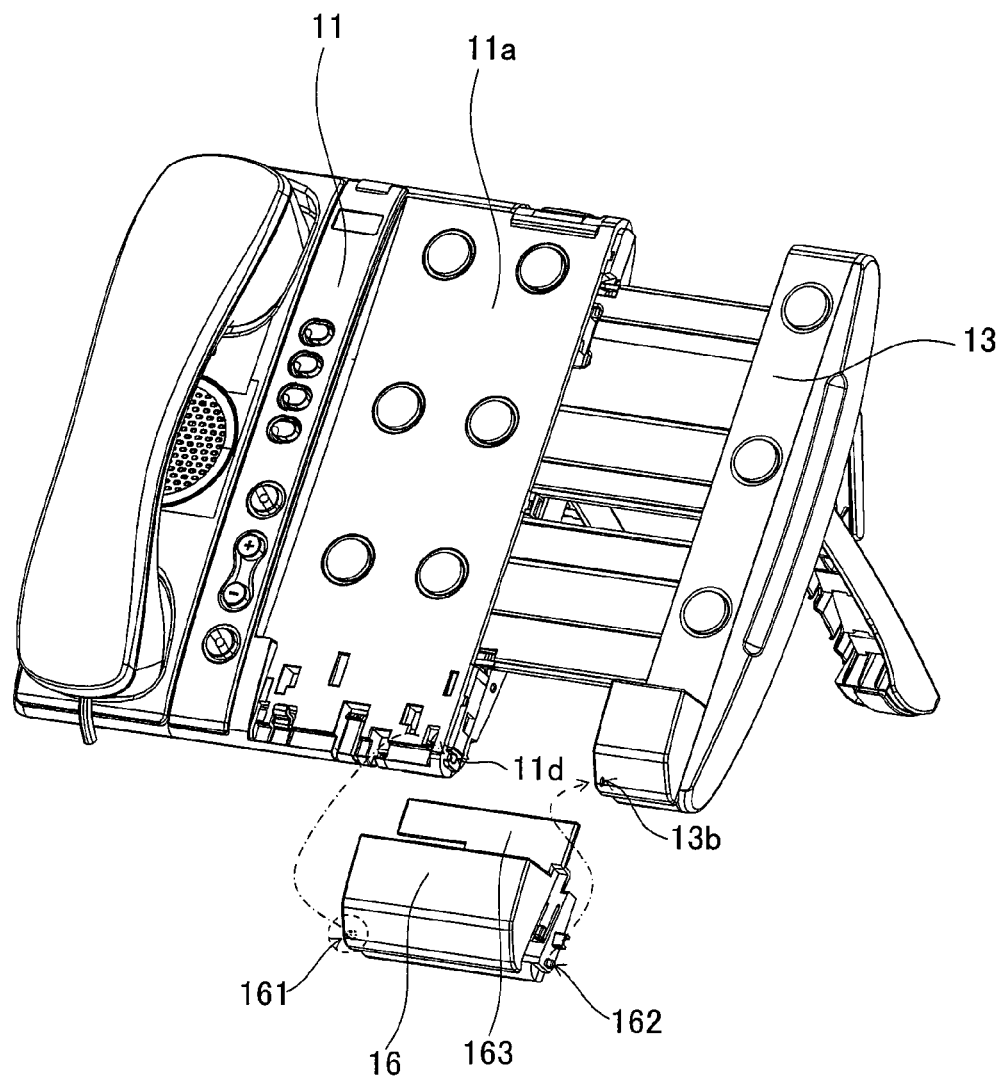
FIG. 3 is a perspective view illustrating mounting of the extensible terminal cover.
Figure 4:
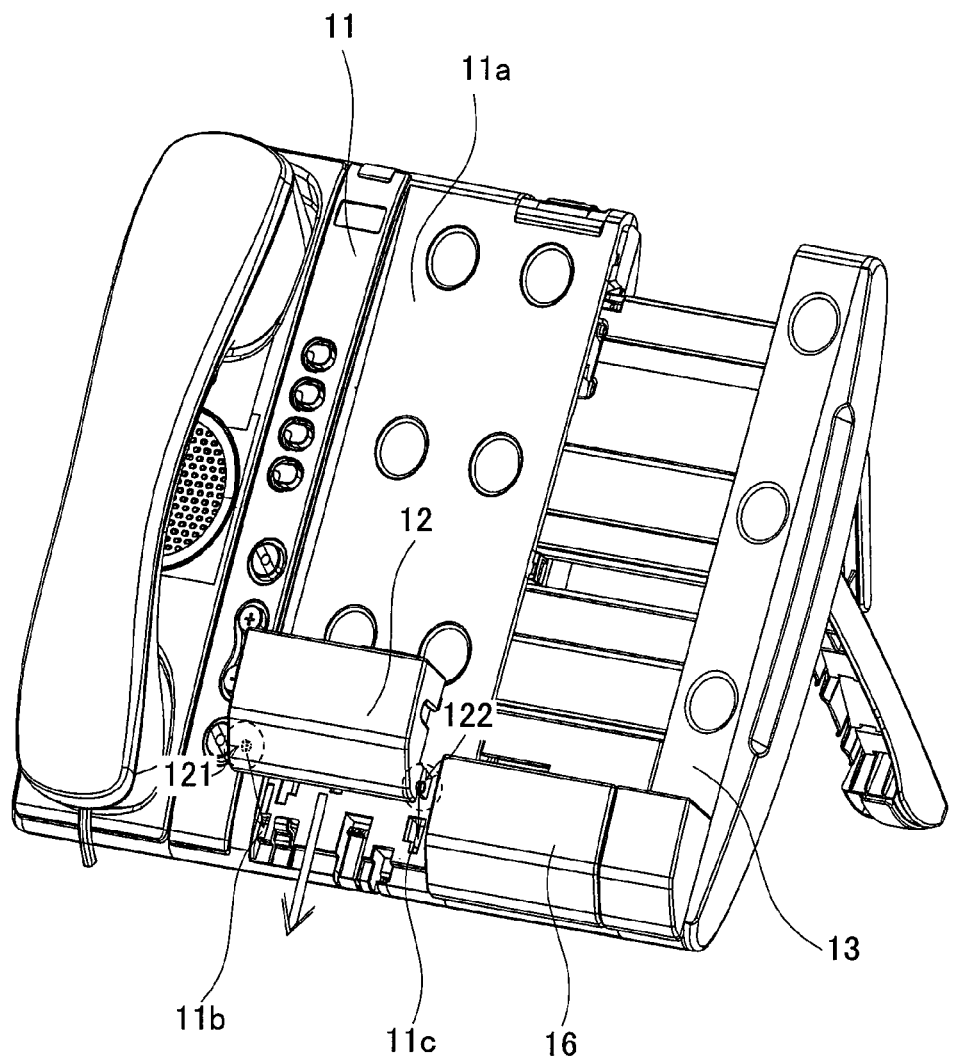
FIG. 4 is a perspective view illustrating mounting of a terminal cover.
Figure 6:
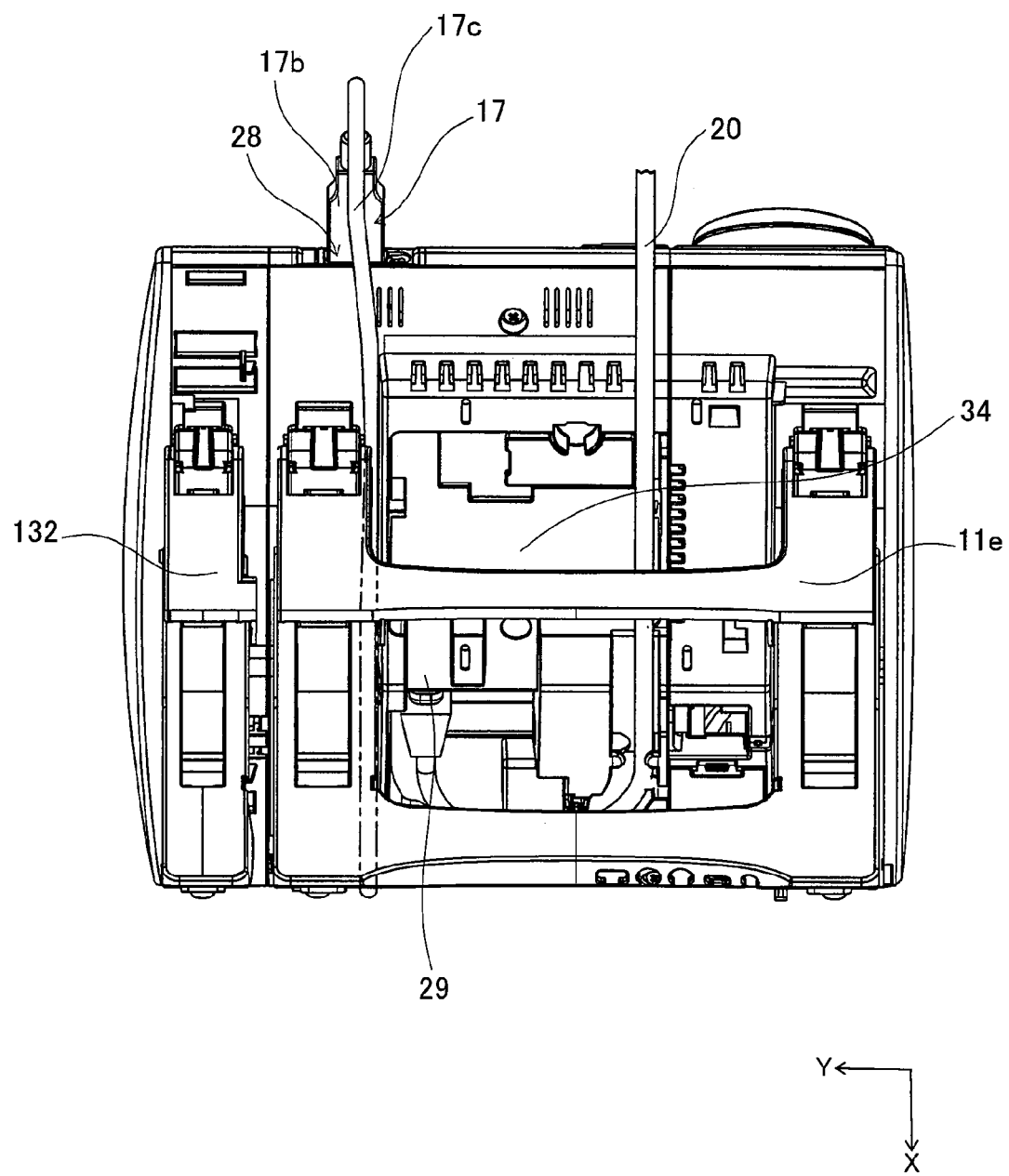
FIG. 6 is a plan view illustrating the terminal holding stand as seen from a back surface side.

As illustrated in FIGS. 1 and 2, the terminal holding stand 10 includes a holding stand main body 11 including a main mounting surface 11a inclined at a predetermined angle with respect to a horizontal surface such as a desk surface. As illustrated in FIG. 4, the holding stand main body 11 includes, at a lower portion of the holding stand main body 11, a first bearing portion 11b configured to bear a first shaft portion 121 of a terminal cover 12, and a second bearing portion 11c configured to bear a second shaft portion 122 of the terminal cover 12. Further, as illustrated in FIG. 3, the holding stand main body 11 includes a U-shaped third bearing portion 11d configured to bear a first shaft portion 161 of an extensible terminal cover 16. In addition, as illustrated in FIG. 6, the holding stand main body 11 includes, on a back surface of the holding stand main body 11, a leg 11e for supporting the holding stand main body 11. The leg 11e enables the main mounting surface 11a to be inclined at a predetermined angle with respect to the horizontal surface.

Figure 5:
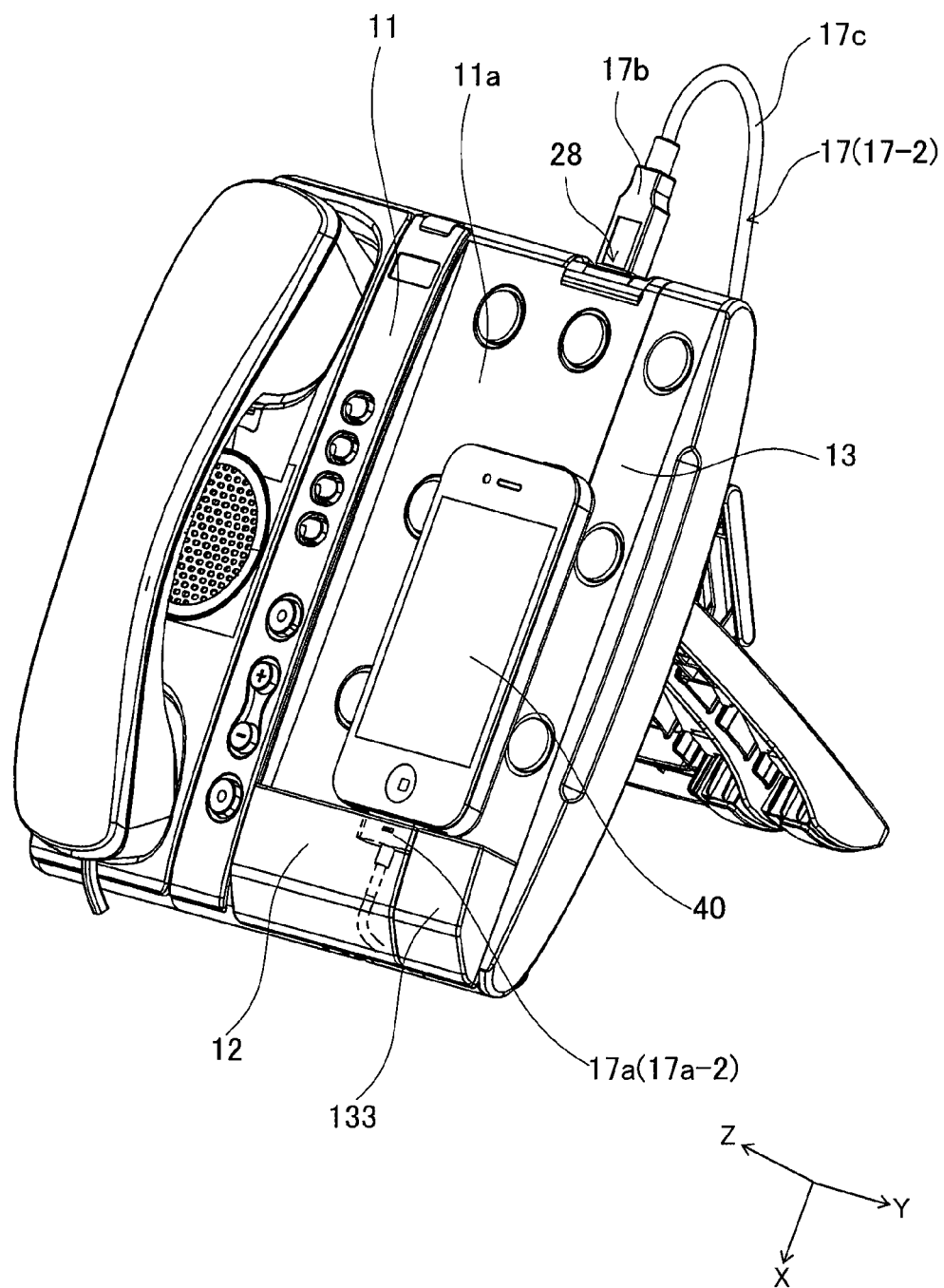
FIG. 5 is a perspective view illustrating a state in which a first portable terminal (a smartphone) is held on the terminal holding stand.
Figure 7:
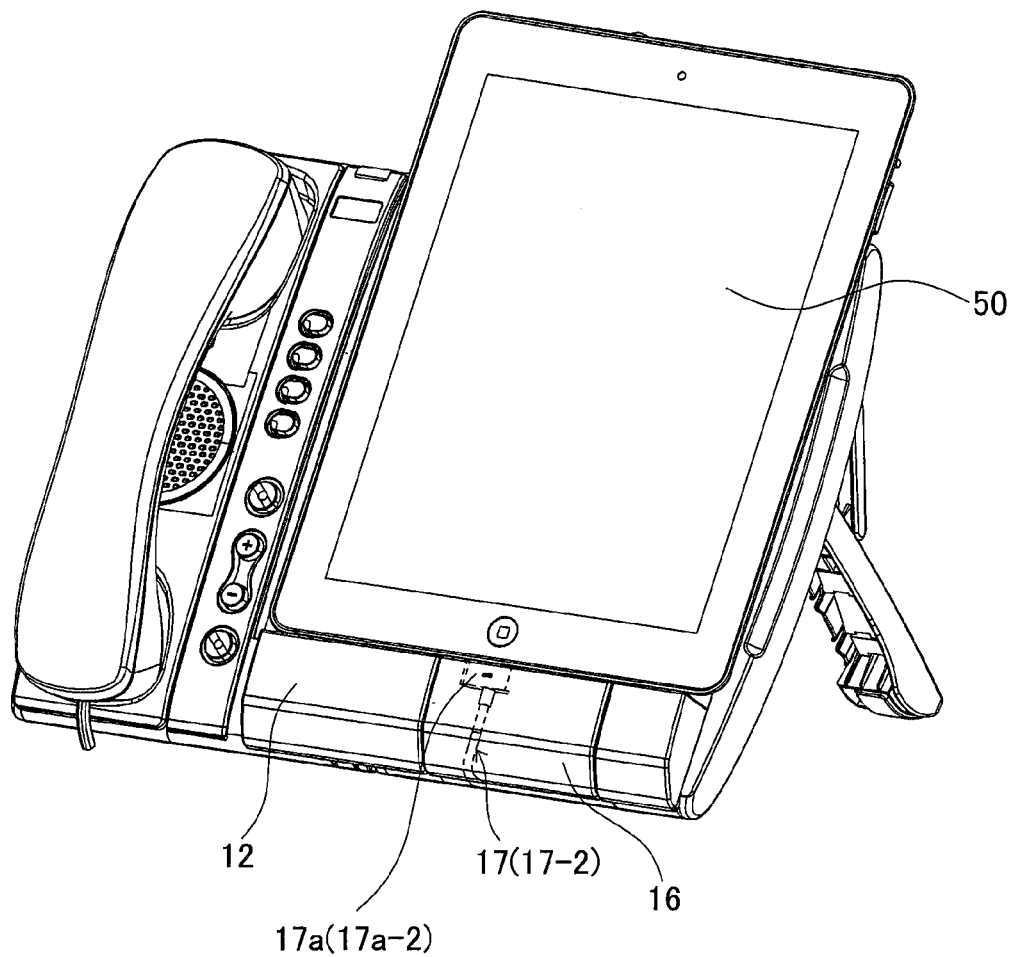
FIG. 7 is a perspective view illustrating a state in which a second portable terminal (a tablet terminal) is held on the terminal holding stand.
Figure 8:
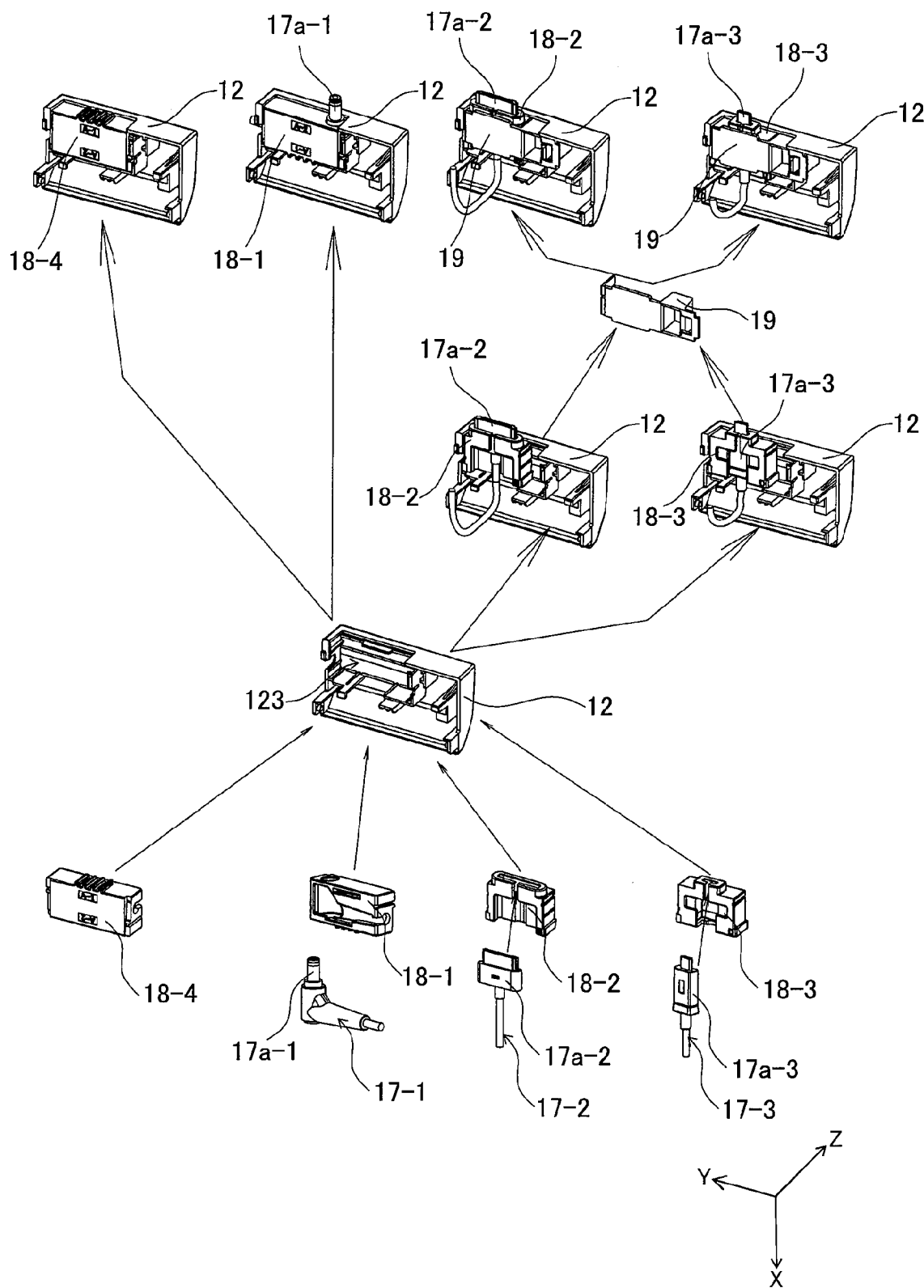
FIG. 8 is an explanatory diagram illustrating mounting of a plurality of types of connector cables to the terminal cover using a plurality of types of connector holders.

Further, as illustrated in FIGS. 5 and 7, the terminal holding stand 10 includes the terminal cover (terminal support section) 12 configured to support a lower end of the portable terminals 40 and 50 to be held on the main mounting surface 11a (and an extensible mounting surface 13a). As illustrated in FIG. 4, the terminal cover 12 is detachably attached to a lower end of the main mounting surface 11a. Further, as illustrated in FIG. 4, the terminal cover 12 includes the first shaft portion 121 protruding along the Y-axis direction from a second side edge portion (left side edge portion) of the terminal cover 12, and the second shaft portion 122 protruding along the Y-axis direction from a first side edge portion (right side edge portion) of the terminal cover 12. As illustrated in FIG. 4, the first shaft portion 121 of the terminal cover 12 is borne by the first bearing portion 11b of the holding stand main body 11 and the second shaft portion 122 of the terminal cover 12 is borne by the second bearing portion 11c of the holding stand main body 11. With this, the terminal cover 12 is mounted to the holding stand main body 11 in such a state that the terminal cover 12 can pivot about an axis of the Y-axis direction. Further, separate to the first shaft portion 121 and the second shaft portion 122, the terminal cover 12 is engaged with the holding stand main body 11. Consequently, in a state in which the terminal cover 12 is mounted to the holding stand main body 11, the terminal cover 12 is capable of pivoting toward a front surface side by a predetermined angle range (in this embodiment, about 10°) while being urged toward the back surface side. As illustrated in FIG. 8, the terminal cover 12 includes a holder receiving portion 123 for holding a connector holder 18 in a fixed state.

In addition, as illustrated in FIGS. 1 and 2, the terminal holding stand 10 includes an extensible holding member 13 provided on a first side edge portion side (in the example of the figures, on a right edge portion side) of the holding stand main body 11. As illustrated in FIG. 2, the extensible holding member 13 includes a slide plate 131 that is slidable inside the holding stand main body 11 in a direction away from the holding stand main body 11 (in the example of the figure, in a rightward direction). As illustrated in FIGS. 1 and 2, the extensible holding member 13 has the extensible mounting surface 13a that is arranged in parallel to and in the same plane as the main mounting surface 11a. The extensible holding member 13 includes a leg 132 similar to the leg 11e of the holding stand main body 11 on a back surface of the extensible holding member 13. The leg 132 enables the extensible mounting surface 13a to be inclined at a predetermined angle with respect to the horizontal surface. The extensible holding member 13 includes a stopper 133 serving as an extensible terminal support section, for supporting the lower end of the portable terminals 40 and 50. As illustrated in FIG. 3, the extensible holding member 13 includes, at a lower portion of a second side edge portion (left side edge portion) of the extensible holding member 13, a bearing portion 13b configured to bear a second shaft portion 162 of the extensible terminal cover 16.

Further, the terminal holding stand 10 includes cushions 15 formed from an elastic and slightly adhesive material. As illustrated in FIG. 1, the cushions 15 are arranged on the main mounting surface 11a and the extensible mounting surface 13a. By thus providing the cushions 15 on the main mounting surface 11a and the extensible mounting surface 13a, differences in the size of the portable terminals 40 and 50 in the thickness direction (Z-axis direction) can be handled, and the portable terminals 40 and 50 can be prevented from falling. In the example of the figure, six cushions 15 are arranged on the main mounting surface 11a, and three cushions 15 are arranged on the extensible mounting surface 13a. However, the number of cushions 15 may be freely set.

As illustrated in FIGS. 2 and 3, the terminal holding stand 10 includes the extensible terminal cover 16 to be detachably attached to a lower end of the slide plate 131 at a position between the main mounting surface 11a and the extensible mounting surface 13a when the extensible holding member 13 is extended to a predetermined extension position. As illustrated in FIG. 3, the extensible terminal cover 16 includes the first shaft portion 161 protruding along the Y-axis direction from a second side edge portion (left side edge portion) of the extensible terminal cover 16, and the second shaft portion 162 protruding along the Y-axis direction from a second first side edge portion (right side edge portion) of the extensible terminal cover 16. As illustrated in FIG. 3, the first shaft portion 161 of the extensible terminal cover 16 is borne by the third bearing portion 11d of the holding stand main body 11 and the second shaft portion 162 of the extensible terminal cover 16 is borne by the bearing portion 13b of the extensible holding member 13. With this, the extensible terminal cover 16 is mounted to the extensible holding member 13 and the holding stand main body 11 in such a state that the extensible terminal cover 16 can pivot about an axis of the Y-axis direction. Further, separate to the first shaft portion 161 and the second shaft portion 162, the extensible terminal cover 16 is engaged with at least one of the extensible holding member 13 and the holding stand main body 11. Consequently, in a state in which the extensible terminal cover 16 is mounted to the extensible holding member 13 and the holding stand main body 11, the extensible terminal cover 16 is capable of pivoting toward the front surface side by a predetermined angle range (in this embodiment, about 10°) while being urged toward the back surface side. As illustrated in FIG. 2, the extensible terminal cover 16 includes an auxiliary mounting surface 163 that is arranged in parallel to and in the same plane as the main mounting surface 11a of the holding stand main body 11 and the extensible mounting surface 13a of the extensible holding member 13 in a state in which the extensible terminal cover 16 is mounted to the extensible holding member 13 and the holding stand main body 11.

Further, the terminal holding stand 10 itself functions as an Internet Protocol (IP) telephone compliant with the RFC-3261 protocol and has a fixed directory number assigned to the IP telephone. At the same time, the terminal holding stand 10 is configured to operate together with the portable terminal 40 or 50 via a Bluetooth communication to enable a speech established by the second speech control section 42 or 52 of the portable terminal 40 or 50 to be made through use of a first transmission/reception section 60 of the terminal holding stand 10. It is to be noted that, in this embodiment, the terminal holding stand 10 including no dial button and hence cannot establish an outgoing call, but may be configured to establish an outgoing call through use of functions buttons 23.

Further, as illustrated in FIG. 1 and FIG. 9, the terminal holding stand 10 includes an incoming call lamp 25, a speech switch button 26, a Bluetooth module linking button 27, a LAN port 29 (see FIG. 6), a Bluetooth module 34, the first transmission/reception section 60, and a first control section 30 configured to control those module and sections. As illustrated in FIG. 9, those module and sections are connected to one another.

As illustrated in FIG. 1, the first transmission/reception section 60 enables the user to transmit and receive a speech, and includes a handset 61 including a handset microphone 62 and a handset speaker 63, a microphone 65, and a speaker 66. The holding stand main body 11 is provided with a hook switch 64. When a voice path described later is set to the terminal holding stand 10 (specifically, a first speech control section 31), the hook switch 64 operates simultaneously with a start and an end of a speech established by the first speech control section 31. When the voice path is set to the portable terminal 40 or 50 (specifically, the second speech control section 42 or 52), the hook switch 64 operates simultaneously with a start and an end of a speech established by the second speech control section 42 or 52.

The Bluetooth module 34 (see FIG. 6) is a module functioning as a terminal communication section configured to wirelessly communicate to and from the portable terminal 40 or 50 (specifically, the Bluetooth module 43 or 53) held by the terminal holding stand 10. As illustrated in FIG. 6, the Bluetooth module 34 is constructed as a unit to be detachably attached to a predetermined position of the back surface of the holding stand main body 11.

In addition, although the Bluetooth is adopted as communication section between the terminal holding stand 10 and the portable terminal 40 or 50 in this embodiment, communication section between the terminal holding stand 10 and the portable terminal 40 or 50 is not limited thereto. The communication section may also be wireless communication such as infrared communication or wired communication. In this embodiment, however, the wireless communication is preferred because this embodiment adopts such a holding mode that the portable terminal 40 or 50 is mounted to be held on the main mounting surface 11a and the extensible mounting surface 13a, which are inclined with respect to the horizontal surface, and a position at which the portable terminal 40 or 50 is held with respect to the terminal holding stand 10 is not mounted. Further, it is preferred to adopt the Bluetooth, which has a longer communicable distance and a lower directivity as compared with the infrared communication and the like.

The Bluetooth module linking button 27 is a button functioning as a communication request input section configured to receive from the user a communication request to establish communication to and from the portable terminal 40 or 50 through use of the Bluetooth module 34. In other words, by depressing the Bluetooth module linking button 27, the user can establish communication between the portable terminal 40 or 50 and the terminal holding stand 10, to thereby enable the portable terminal 40 or 50 and the terminal holding stand 10 to operate together with each other. Further, in this embodiment, the Bluetooth module 34 is also configured to transmit a connection request to the portable terminal 40 or 50 that the Bluetooth module 34 communicated to and from last time and automatically perform processing of connecting to the portable terminal 40 or 50. The connection between the terminal holding stand 10 and the portable terminal 40 or 50 can be established manually through depression of the Bluetooth module linking button 27, and can also be established automatically by the Bluetooth module 34. The terminal holding stand 10 is configured so that the user can arbitrarily switch the connection form between the manual connection and the automatic connection.

As illustrated in FIG. 6, the LAN port 29 is a port into which one end of a LAN cable 20 for the IP telephone is to be inserted for connection. The LAN cable 20 is connected to a first speech circuit.

The first control section 30 is formed of a circuit component (not shown) such as a CPU. As illustrated in FIG. 9, the first control section 30 includes the first speech control section 31 configured to establish a speech via the first speech circuit, a voice path control section 32, and an incoming call control section 33.

The voice path control section 32 is a component configured to control a voice path of a speech. To be specific, the voice path control section 32 establishes the voice path one of between the first speech control section 31 and the first transmission/reception section 60 and between the terminal communication section (specifically, the second speech control section 42 or 52) and the first transmission/reception section 60. In other words, when the voice path is established between the first speech control section 31 and the first transmission/reception section 60, a speech established by the first speech control section 31 can be made through use of the first transmission/reception section 60. Further, when the portable terminal 40 or 50 and the terminal holding stand 10 operate together with each other via the Bluetooth communication and the voice path is established between the second speech control section 42 or 52 and the first transmission/reception section 60, a speech established by the second speech control section 42 or 52 can be made through use of the first transmission/reception section 60. The user depresses the speech switch button 26, to thereby switch the speech control section from which the voice path is established to the first transmission/reception section 60 between the first speech control section 31 and the second speech control section 42 or 52. The speech switch button 26 includes an LED. The speech switch button 26 also functions as a voice path setting notification section configured to notify the user of, through light emission of the LED, which of the first speech control section 31 and the second speech control section 42 or 52 the voice path is currently set to.

Further, when a switching request to switch the voice path, which is made by the user through depression of the speech switch button 26, is received under a state in which a speech is established by the second speech control section 42 or 52 and the voice path is formed between the second speech control section 42 or 52 and the first transmission/reception section 60, the voice path control section 32 disconnects the voice path between the second speech control section 42 or 52 and the first transmission/reception section 60 while the speech established by the second speech control section 42 or 52 is maintained, and instead, the voice path between the second speech control section 42 or 52 and the second transmission/reception section 45 or 55 is established. In other words, the voice path control section 32 switches the transmission/reception section that can be used by the user from the first transmission/reception section 60 to the second transmission/reception section 45 or 55 without disconnecting a speech established by the second speech control section 42 or 52 of the portable terminal 40 or 50, to thereby enable the user to continue the speech.

The incoming call control section 33 is a component configured to control a call incoming to the first speech control section 31 and the second speech control section 42 or 52. The incoming call control section 33 distinguishes, under a state in which the Bluetooth communication is established between the terminal holding stand 10 and the portable terminal 40 or 50, a case where a call is incoming to one of the first speech control section 31 and the second speech control section 42 or 52 to which the voice path to the first transmission/reception section 60 is set and a case where a call is incoming to the other thereof to which the voice path to the first transmission/reception section 60 is not set, and causes an incoming call notification section (incoming call lamp 25, speaker 66, and LED of speech switch button 26) to perform notification whose form differs for each of the cases. In addition, incoming call information at a time when a call is incoming to the second speech control section 42 or 52 is transmitted to the incoming call control section 33 via the Bluetooth communication between the terminal holding stand 10 and the portable terminal 40 or 50. Further, in this embodiment, the incoming call lamp 25 configured to perform notification through lighting, the speaker 66 configured to perform notification through a ringtone, and the speech switch button 26 configured to perform notification through lighting of the LED are used as the incoming call notification section, but a specific mode of the incoming call notification section is not limited thereto.

As illustrated in FIG. 1, the terminal holding stand 10 further includes volume buttons 21, a speaker button 22, the plurality of function buttons 23, and a microphone button 24.

The terminal holding stand 10 includes a connector 28. As illustrated in FIG. 1, the connector 28 is formed on an upper end edge portion of the holding stand main body 11. The connector 28 is configured so that a second connector 17*b* of a connector cable 17 is inserted and fitted into the connector 28. The connector 28 is connected to a commercial power supply (not shown) via a power supply circuit (not shown) in the terminal holding stand 10 and a cable (not shown).

The terminal holding stand 10 includes the connector cable 17 and a connector holder 18 (FIG. 8).

As illustrated in FIGS. 5 and 6, the connector cable 17 includes a first connector 17*a* to be connected to a terminal side connector (not shown) of the first portable terminal 40, the second connector 17*b* to be connected to the connector 28, and a cable 17*c* connecting the first connector 17*a* and the second connector 17*b*. In this embodiment, although the second connector 17*b* is specified by a USB connector, the second connector 17*b* is practically not limited to the illustrated USB connector. A secondary battery (lithium ion battery) built into the portable terminals 40 and 50 can be charged by electrically connecting the terminal holding stand 10 to the portable terminals 40 and 50 with the connector cable 17. In addition, the connector cable 17 may also be used for other applications, such as data transfer between the terminal holding stand 10 and the portable terminals 40 and 50.

As illustrated in FIG. 8, a plurality of types of connector cables 17 are prepared in accordance with the specifications of the terminal side connectors (not shown) of the plurality of types of portable terminals 40 and 50. Specifically, in this embodiment, as illustrated in FIG. 8, as a first connector 17a-1, a connector cable 17-1 having a DC jack for an AC/DC adapter (not shown) on a tip portion, as a first connector 17a-2, a connector cable 17-2 having a dock connector on a tip portion, and as a first connector 17a-3, a connector cable 17-3 having a mini USB connector on a tip portion, are prepared. In addition, the specific mode of the connector cable 17 is not limited to the above-mentioned examples, and any type of connector cable may be used.

As illustrated in FIG. 8, the connector holder 18, which holds the first connector 17a of the connector cable 17, is mounted in a fixed state to the terminal cover 12 or the extensible terminal cover 16. In FIG. 8 illustrates the mounting of the first connector 17a to the terminal cover 12 using the connector holder 18. Here, the mounting of the first connector 17a to the extensible terminal cover 16 using the connector holder 18 is the same as the mounting of the first connector 17a to the terminal cover 12 using the connector holder 18 illustrated in FIG. 8, and hence illustration and description of such a case is omitted here.

As illustrated in FIG. 8, a plurality of types of connector holders 18 are prepared in accordance with the specifications of the first connector 17a of the connector cable 17. Specifically, in this embodiment, as illustrated in FIG. 8, provision is made of an AC/DC type connector holder 18-1 configured to hold the first connector (DC jack) 17a-1, a docking type connector holder 18-2 configured to hold the first connector (dock connector) 17a-2, and a mini USB type connector holder 18-3 configured to hold the first connector (mini USB connector) 17a-3. In this embodiment, as illustrated in FIG. 7, when the first connector 17a is mounted to the extensible terminal cover 16, provision is also made about a blank type connector holder 18-4 which is mounted to the terminal cover 12 and which embeds the holder receiving portion 123 of the terminal cover 12 is prepared.

In this embodiment, when the first connector 17a is mounted to the terminal cover 12 using the connector holders 18-1 and 18-2, as illustrated in FIG. 8, a holder support 19 is used, which is mounted in a fixed state to the terminal cover 12. The holder support 18 is mounted to the terminal cover 12 in cooperation with the connector holders 18-1 and 18-2 to mount the first connectors 17a-1 and 17a-2 to the terminal cover 12.

According to this embodiment acquired in the above-mentioned manner, through provision of the first speech control section 31 configured to establish a speech via the first speech circuit different from that of the portable terminal 40 or 50 to the terminal holding stand 10, it is possible to use the terminal holding stand 10 itself as a telephone set independently of the portable terminal 40 or 50. In addition, it is possible to make a speech through use of the first transmission/reception section 60 of the terminal holding stand 10 both of the case where the speech is established by the first speech control section 31 of the terminal holding stand 10 and the case where the speech is established by the second speech control section 42 or 52 of the portable terminal 40 or 50. It is therefore possible to facilitate diversification of the usage form, and thus it is possible to enhance the convenience of the user.

Further, from the state in which a speech is established by the second speech control section 42 or 52 of the portable terminal 40 or 50 and the speech is being made through use of the first transmission/reception section 60 of the terminal holding stand 10, it is possible to switch the voice path to the first transmission/reception section 60 of the terminal holding stand 10 to the voice path to the second speech control section 42 or 52 second transmission/reception section 45 or 55 of the portable terminal 40 or 50, without disconnecting the speech established by the second speech control section 42 or 52 of the portable terminal 40 or 50. It is therefore possible to cope with such a situation as a case where there arises a need for the user to, during a speech, move to another location while continuing the speech, and thus it is possible to further enhance the convenience of the user.

Further, a holding state is formed by holding the portable terminals 40 and 50 and by mounting the portable terminals 40 and 50 on the main mounting surface 11a and the extensible mounting surface 13a that are inclined with respect to the horizontal surface. Consequently, the portable terminals 40 and 50 can be freely held at a preferred position of the user.

In addition, the extensible holding member 13 capable of sliding with respect to the holding stand main body 11 is provided. Thus, the mounting surfaces (main mounting surface 11a and extensible mounting surface 13a) on which the portable terminals 40 and 50 are to be mounted can be extended in the right-and-left direction (Y-axis direction), which enables the portable terminals 40 and 50 having different length and width dimensions to be appropriately held.

Through adoption of the Bluetooth having a longer communicable distance and a lower directivity as compared with the infrared communication and the like as the communication section between the terminal holding stand 10 and the portable terminal 40 or 50, even in the case where the position at which the portable terminal 40 or 50 is held with respect to the terminal holding stand 10 is not mounted as in this embodiment, it is possible to securely establish the communication between the terminal holding stand 10 and the portable terminal 40 or 50, to thereby enable the terminal holding stand 10 and the portable terminal 40 or 50 to operate together with each other.

This invention has been described above with reference to the embodiment, but this invention is not limited to the above-mentioned embodiment. Various modifications understandable for those skilled in the art would be possible in connection with the configurations and details of this invention within the scope of this invention. For example, in the above-mentioned embodiment, exemplary description has been given of the case of holding one of the two types of portable terminals including the first portable terminal 40 and the second portable terminal 50. Those skilled in the art may easily arrive at such a modification that would hold one portable terminal selected from three or more types.

REFERENCE SIGNS LIST 10 terminal holding stand
11 holding stand main body
11a main mounting surface
11b first bearing portion
11c second bearing portion
11d third bearing portion
11e leg
12 terminal cover (terminal support section)
121 first shaft portion
122 second shaft portion
123 holder receiving portion
13 extensible holding member
13a extensible mounting surface
13b bearing portion
131 slide plate
132 leg
133 stopper (extensible terminal support section)
15 cushion
16 extensible terminal cover
161 first shaft portion 162 second shaft portion
163 auxiliary mounting surface
17 connector cable
17a first connector
17b second connector
17c cable
18 connector holder
19 holder support
20 LAN cable
21 volume button
22 speaker button
23 function button
24 microphone button
25 incoming call lamp (incoming call notification section)
26 speech switch button (switching request input section, incoming call notification section, voice path setting notification section)
27 Bluetooth module linking button (communication request input section)
28 connector
29 LAN port
30 first control section
31 first speech control section
32 voice path control section
33 incoming call control section
34 Bluetooth module (terminal communication section)
40 first portable terminal
41 second control section
42 second speech control section
43 Bluetooth module
44 antenna section
45 second transmission/reception section
50 second portable terminal
51 second control section
52 second speech control section
53 Bluetooth module
54 antenna section
55 second transmission/reception section
60 first transmission/reception section
61 handset
62 handset microphone
63 handset speaker
64 hook switch
65 microphone
66 speaker (incoming call notification section)

The invention claimed is:

1. A terminal holding stand including a speech function and being capable of holding a portable terminal,
the portable terminal comprising:
a second transmission/reception section comprising a microphone and a speaker; and
a second speech control section configured to establish a speech via a second speech circuit,
the terminal holding stand comprising:
a first speech control section configured to establish a speech via a first speech circuit different from the portable terminal in circuit, the terminal holding stand itself being usable as a telephone set independently of the portable terminal and making a speech by the use of a first transmission/reception section of the terminal holding stand, the speech being performed through the first speech control section of the terminal holding stand in each of the case where the speech is established through the first speech control section of the terminal holding stand and the case where the speech is established by the second speech control section of the portable terminal;
a terminal communication section configured to communicate to and from the portable terminal;
the first transmission/reception section connected to the first speech control section and the terminal communication section, the first transmission/reception section comprising a microphone and a speaker, which enable a user to transmit and receive a speech via the first speech circuit;
a voice path control section connected to the first transmission/reception section, the first speech control section, and the terminal communication section, the voice path control section being configured to establish a voice path one of between the first speech control section and the first transmission/reception section or between the terminal communication section and the first transmission/reception section; and
a switching request input section connected to the voice path control section, the switching request input section being configured to receive from the user a switching request to switch the voice path,
wherein when the switching request is received by the switching request input section under a state in which a speech is established by the second speech control section and a voice path is formed between the second speech control section and the first transmission/reception section via the terminal communication section, the voice path control section disconnects the voice path between the second speech control section and the first transmission/reception section while the speech established by the second speech control section is maintained, and instead, the voice path between the second speech control section and the second transmission/reception section is established; and
the terminal holding stand including no dial button.

2. A terminal holding stand including a speech function according to claim 1, further comprising a voice path setting notification section configured to notify a user that the voice path is currently established to the first transmission/reception section through either one of the first speech control section and the second speech control section.

3. A terminal holding stand including a speech function according to claim 1, further comprising:
an incoming call notification section configured to notify the user that a call is incoming; and
an incoming call control section configured to control the incoming call notification section,
wherein the incoming call control section distinguishes, under a state in which the communication to and from the portable terminal is established by the terminal communication section, a case where a call is incoming to one of the first speech control section and the second speech control section from which the voice path to the first transmission/reception section is established and a case where a call is incoming to another of the first speech control section and the second speech control section from which the voice path to the first transmission/reception section is not established, and causes the incoming call notification section to perform notification whose form differs for each of the cases.

4. A terminal holding stand including a speech function according to claim 1, further comprising a communication request input section configured to receive from the user a communication request to establish the communication to and from the portable terminal through use of the terminal communication section.

5. A terminal holding stand including a speech function according to claim 1, wherein the terminal communication section is constructed as a unit to be detachably attached to a holding stand main body.

6. A terminal holding stand including a speech function according to claim 1, wherein the terminal holding stand comprises a terminal holding section configured to hold the portable terminal, the terminal holding section being formed so as to be inclined with respect to a horizontal surface, the terminal holding section comprising, on an upper surface thereof, a mounting surface configured to mount and hold the portable terminal.

7. A terminal holding stand including a speech function according to claim 6, wherein the terminal holding section further comprises a terminal support section arranged at a lower end of the mounting surface, the terminal support section being configured to support a lower end of the portable terminal mounted on the mounting surface.

8. A terminal holding stand including a speech function according to claim 6, further comprising:
- a holding stand main body comprising the mounting surface; and
- an extensible holding member arranged so as to be slidable with respect to the holding stand main body,
- wherein the terminal holding section further comprises an extensible mounting surface, which is formed on the extensible holding member, and is movable in parallel to the mounting surface.

* * * * *